US012202102B2

(12) United States Patent
Figueroa

(10) Patent No.: US 12,202,102 B2
(45) Date of Patent: Jan. 21, 2025

(54) ADJUSTABLE IMPACT WRENCH AND GROUND ANCHOR ASSEMBLY

(71) Applicant: Roberto Figueroa, Redondo Beach, CA (US)

(72) Inventor: Roberto Figueroa, Redondo Beach, CA (US)

(*) Notice: Subject to any disclaimer, the term of this patent is extended or adjusted under 35 U.S.C. 154(b) by 417 days.

(21) Appl. No.: 17/807,586

(22) Filed: Jun. 17, 2022

(65) Prior Publication Data

US 2023/0405770 A1 Dec. 21, 2023

(51) Int. Cl.

| | |
|---|---|
| ***B25B 13/48*** | (2006.01) |
| ***B25B 19/00*** | (2006.01) |
| ***B25B 23/00*** | (2006.01) |
| ***E02D 5/80*** | (2006.01) |
| ***E02D 7/06*** | (2006.01) |

(52) U.S. Cl.
CPC .............. *B25B 13/48* (2013.01); *B25B 19/00* (2013.01); *B25B 23/0035* (2013.01); *E02D 5/80* (2013.01); *E02D 7/06* (2013.01)

(58) Field of Classification Search
CPC ......... B25B 19/00; B25B 17/00; B25B 17/02; B25B 23/0035; E02D 5/80; E02D 5/803; E02D 7/06; B60B 29/003; B60B 29/005; B25F 1/02
See application file for complete search history.

(56) References Cited

U.S. PATENT DOCUMENTS 2,308,428 A 6/1939 Ronning et al.
2,313,398 A 6/1939 Ronning
2,600,796 A 5/1949 Nash
2,870,884 A * 1/1959 Mazur ........................ E02D 5/80 52/158
3,158,050 A 11/1964 Shandel
(Continued)

FOREIGN PATENT DOCUMENTS

CN 108071114 A 5/2018
KR 101457984 B1 11/2014
WO 2017160244 3/2016

OTHER PUBLICATIONS

Forrest Tool Co.; The Safety Impact Wrench, Commercial; Durango, CO.

(Continued)

*Primary Examiner* — David B. Thomas
(74) *Attorney, Agent, or Firm* — Simpson & Simpson, PLLC

(57) ABSTRACT

An adjustable impact wrench and ground anchor assembly including a torque bar having a plurality of apertures disposed therein, where the plurality of apertures have a first and second diameter, a wrench shaft having a first and second end, a chuck arranged at the first end, a handle arranged at the second end, where the wrench shaft is arranged to engage one of the first diameter apertures of the plurality of apertures therein, a clamp, said clamp arranged to accept said wrench shaft through an aperture disposed therein, a pin arranged to engage a pin aperture of the wrench shaft and is further arranged to sandwich the torque bar between the pin and the clamp, a plurality of spikes arranged to engage the second diameter of apertures of the plurality of apertures, and a clip arranged to engage one of a pair of end apertures of the plurality of apertures.

19 Claims, 10 Drawing Sheets

(56) References Cited

U.S. PATENT DOCUMENTS

| | | | | |
|---|---|---|---|---|
| 3,216,159 | A | 11/1965 | Rooker | |
| 4,628,776 | A | 12/1986 | Witbeck | |
| D291,961 | S | 9/1987 | Andersson | |
| D293,413 | S | 12/1987 | Witbeck | |
| 4,759,242 | A | 7/1988 | Andersson | |
| 5,095,784 | A * | 3/1992 | Garver | B25B 19/00 81/463 |
| 5,515,656 | A * | 5/1996 | Mihalich | B64F 1/12 248/156 |
| 5,910,198 | A | 6/1999 | Maher | |
| 6,085,621 | A * | 7/2000 | Nezigane | B25B 13/467 81/465 |
| 6,662,692 | B2 | 12/2003 | Anderson | |
| 8,528,449 | B2 | 9/2013 | Cheng | |
| 9,003,933 | B1 | 4/2015 | Tucker | |
| 9,133,594 | B2 | 9/2015 | Hurley | |
| 11,364,612 | B1 * | 6/2022 | Campbell | B23D 63/003 |
| 2002/0162425 | A1 | 11/2002 | Castrorao | |

OTHER PUBLICATIONS

Forrest Tool Co.; The Safety Impact Wrench, Military; Durango, CO.

* cited by examiner

ADJUSTABLE IMPACT WRENCH AND GROUND ANCHOR ASSEMBLY

FIELD

The present invention relates generally to an adjustable impact wrench and ground anchor assembly, specifically to a collapsible and adjustable impact wrench, and a ground anchor having a plurality of removable ground spike disposed therein.

BACKGROUND

In a previously known adjustable impact wrench device, the device includes a shaft with a handle in one end and a socket in the opposite end, whereby the shaft between its ends is provided with a hub about which is rotatably arranged about an impact arm which carries weights and is arranged to transfer impact movement to the shaft via stops arranged at the hub, in connection to the hub are arranged members which limit the ability of the impact arm to transfer movement to the shaft which carries the socket in one direction of movement of the impact arm. The device also includes an arm/bar with a plurality of holes and a weight at each end.

Another previously known impact wrench device provides for a manually operated tool wherein the inertia of weights on a rotatable cross arm is efficiently utilized to loosen or tighten screw threaded parts, such as nuts or bolts; and wherein the blow struck by a weighted arm is positively directed and is converted into a turning moment of a spindle adapted to turn the nut or bolt. The device discloses an arm/bar with a hole and a weight at each end.

A previously known ground anchor system includes a base plate having a top surface and a substantially planar bottom surface, where the base plate has a plurality of picket-guide apertures formed therein between the top surface and the substantially planar bottom surface. At least one picket is removably positioned in at least a portion of the picket-guide apertures. An anchor portion is formed at a first end of the base plate, wherein the anchor portion has an anchor aperture formed through the first end of the base plate, the anchor portion further comprising a ground face surface proximate to the anchor aperture, wherein a distance between the top surface and the ground face surface is less than a distance between the top surface and the substantially planar bottom surface. The previous ground anchor system also includes a plurality of holes which vary in sizes disposed along the bar. The bar also includes an end-link connection device which is connected to a terminal end of the bar.

Prior ground anchor devices commonly utilize spikes that can be inserted into the ground surface to anchor the ground anchor's plate thereto. In some attempts, the spikes are inserted into the ground perpendicular to the ground anchor's plate. In other attempts, the spikes include threading and require not only to be threaded into the plate, but also into the ground.

However, the aforementioned tools are two separate tools, where, even if the two tools are collapsible, i.e., can be disassembled, the two devices will require more storage than a singular tool.

Thus, there is a long-felt need for a combination tool having an adjustable impact wrench and ground anchor assembly that is collapsible for storage.

There is another long-felt need for an impact wrench having an adjustable moment by inserting the wrench portion into a non-centrally located aperture disposed within a torque bar of the impact wrench.

There is a further long-felt need for a ground anchor device that allows a plurality of stakes to be inserted within a torque bar to mount the ground anchor device to the ground, where the ground anchor device can also be configured into an adjustable impact wrench.

There is still a long-felt need for a ground anchor device that allows a plurality of stakes to be inserted within a torque bar at an angle to increase the resistance to the ground therebelow.

Additionally, there is a long-felt need for a ground anchor device that includes a torque bar, which ground spikes and connecting means can be removed therefrom, where the torque bar can accept a wrench device therein to change the ground anchor device into an adjustable impact wrench.

SUMMARY

The present invention generally comprises a combination tool having an adjustable impact wrench functionality and a ground anchor functionality. The combination tool includes a torque bar with a plurality of apertures disposed therein, the apertures arranged to either accept a wrench device within one of the plurality of apertures, secured by a pin and a clamp, or to accept a plurality of ground spikes therein and a connecting means therein.

The present invention broadly comprises an adjustable impact wrench and ground anchor assembly including a torque bar having a first end and a second end, the torque bar having a first set of a plurality of apertures disposed therein and a second set of a plurality of apertures disposed therein, each aperture in the first set having a first diameter and each aperture in the second set having a second diameter, where the first diameter is less than the second diameter, a wrench shaft, the wrench shaft having a first end and a second end, the wrench shaft having a chuck arranged at the first end, the wrench shaft having a removable handle arranged at the second end, the wrench shaft arranged to be seated within one of the first diameter apertures of the plurality of apertures, a clamp, the clamp arranged to accept the wrench shaft through an aperture disposed therein, a pin, the pin arranged to engage a pin aperture of the wrench shaft and further arranged to sandwich the bar between the pin and the clamp, a plurality of spikes, each one of which spikes is arranged to engage at least one of an aperture of the second set of apertures, where each one of the plurality of spikes has a third diameter which is greater than the first diameter, and a clip, the clip arranged to engage one of a pair of end apertures of the plurality of apertures.

The present invention also generally comprises an adjustable impact wrench and ground anchor assembly including a torque bar having a first, a second end, and a plurality of apertures comprising a first set and a second set disposed therein, where the first set of apertures have a first diameter and the second set of apertures have a second diameter, where the first diameter is less than the second diameter, the torque bar having an adjustable impact wrench configuration whereby the torque bar is arranged to accept a wrench shaft within one of the first set of the plurality of apertures, the wrench shaft secured within one of the plurality of apertures of the first diameter via a clamp arranged on the wrench shaft and a pin arranged to engage the wrench shaft, and the torque bar having a ground anchor configuration whereby the torque bar is arranged to accept at least one spike of a plurality of spikes within at one of the second set of the plurality of apertures, each of the plurality of spikes have a diameter greater than the first diameter and less than the second diameter, the torque bar further arranged to accept a clip within one of a pair of end apertures of the second set of the plurality of apertures, the pair of end apertures arranged proximate to the respective first and second ends of the torque bar.

Further, the present invention also generally comprises an adjustable impact wrench and ground anchor assembly including a wrench shaft, a plurality of spikes, and a torque bar having a plurality of apertures, wherein at least two of the plurality of apertures are of different sizes, wherein the wrench shaft is arranged to engage with at least one of the plurality of apertures of the torque bar, wherein each of the plurality of spikes may pass through and engage at least one of the at least two of the plurality of apertures but not pass through and engage at least one other of the at least two of the plurality of apertures.

The adjustable impact wrench of the present invention generally is configured to have an adjustable moment, where the adjustable moment is determined by which of the plurality of apertures of the first diameter functions as the fulcrum of the wrench, i.e., when the wrench shaft is inserted therein.

The adjustable impact wrench of the present invention also generally includes a chuck arranged on the first end of the wrench shaft where the chuck is arranged to accept a socket thereon.

The plurality of spikes of the ground anchor configuration of the present invention generally each have a diameter that is greater than the diameter of the apertures of the first diameter of the plurality of apertures but is less than the diameter of the apertures of the second diameter of the plurality of apertures, where each of the plurality of spikes have an end cap arranged on one end, where the end cap of each of the plurality of spikes has a diameter that is greater than the diameter of the apertures of the second diameter of the plurality of apertures. In other words, in a preferred embodiment, the each of the plurality of ground spikes will not fit within the apertures of the first diameter of the plurality of apertures of the torque bar.

A primary object of the present invention is to provide a combination tool having an adjustable impact wrench and ground anchor assembly that is collapsible for storage.

Another object of the present invention is to provide an impact wrench having an adjustable moment by inserting the wrench portion (i.e., fulcrum) into one of the apertures of the first diameter of the plurality of apertures within the torque bar of the impact wrench.

A further object of the present invention is to provide a ground anchor device that allows a plurality of stakes to be inserted within a torque bar to mount the ground anchor device to the ground, where the ground anchor device can also be configured into an adjustable impact wrench.

A still further object of the present invention is to provide a ground anchor device that includes a torque bar, which ground spikes and connecting means can be removed therefrom, where the torque bar can accept a wrench device therein to change the ground anchor device into an adjustable impact wrench, or alternatively, an adjustable impact wrench having an adjustable moment by inserting the wrench shaft (i.e., the fulcrum) into a non-centrally located aperture disposed within a torque bar of the impact wrench, which wrench portion can be removed from the torque bar, where the torque bar can accept a plurality of spikes within a plurality of apertures along with a connecting means to change the adjustable impact wrench into a ground anchor assembly.

An even further object of the present invention to provide for an adjustable impact wrench that is arranged to accept a socket on a chuck disposed on an end of a wrench shaft, where the socket is arranged to be seated on and around a lug nut, or other like nut, where the adjustable impact wrench is arranged to be rotated to tighten the lug nut, or other like nut, engaged to the chuck.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

It should be appreciated that the embodiments as illustrated are only one of a variety of possible embodiments of the claimed invention. It should also be appreciated that directional adjectives, such as "upper", "lower", "right", "left", and similar variations, are to be interpreted in view of the corresponding drawings, are intended to be exemplary, and non-limiting on the scope of the appending claims.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

Adverting now to the figures, the following description and corresponding figures depict an adjustable impact wrench and ground anchor assembly, where FIGS. 1-5B depict adjustable impact wrench 200 of adjustable impact wrench and ground anchor assembly 100 and FIGS. 6-10 depict ground anchor 300 of adjustable impact wrench and ground anchor assembly 100.

Figure 1:
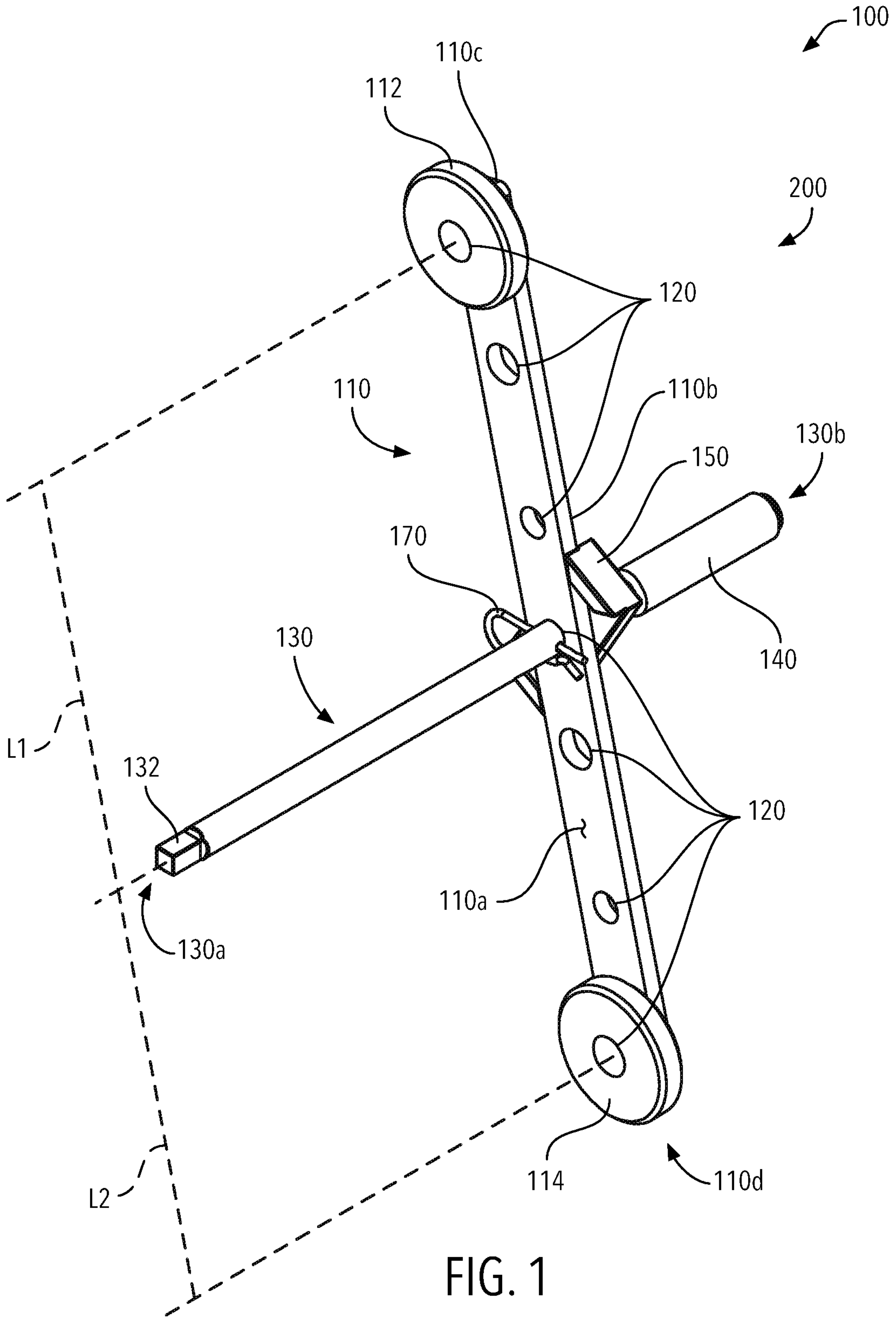
FIG. 1 is a perspective view of the adjustable impact wrench configuration of the present invention.

FIG. 1 is a perspective view of one of two possible configurations of adjustable impact wrench and ground anchor assembly 100 (hereinafter "assembly")—adjustable impact wrench 200 (hereinafter "wrench"), i.e., an adjustable impact wrench configuration of torque bar 110. Torque bar 110 is the main component, or body, of wrench 200. Disposed on opposite sides of torque bar 100 are first face 110*a* and second face 110*b*. Torque bar 110 terminates at first end 110*c* and second end 110*d*. Weights 112 and 114 are arranged on and fixedly secured to first face 110*a*. First weight 112 is arranged proximate first end 110*c* and second weight 114 is arranged proximate second end 110*d*. In a preferred arrangement, first weight 112 and second weight 114 are arranged to extend beyond first end 110*c* and second end 110*d*, respectively. Plurality of apertures 120 are arranged throughout the entirety of torque bar 110. As shown in FIG. 1, the substantially central aperture of plurality of apertures 120 has wrench shaft 130 arranged therein. Wrench shaft 130 is the fulcrum of wrench 100. Wrench shaft 130 is defined by first end 130*a* and second end 130*b* (shown in FIGS. 2C and 3). Chuck 132 is arranged proximate first end 130*a* and handle 140 is arranged proximate second end 130*b*. Handle 140 is arranged to slide over wrench shaft 130.

When assembled, torque bar 110 has wrench shaft 130 inserted into one of plurality of apertures 120, where torque bar 110 is sandwiched by pin 170 and clamp 150. Clamp 150 is prevented from sliding along torque bar 110 by restriction nut 160 (shown in FIGS. 2B and 2C) in a direction towards second end 130*b*. When wrench shaft 130 is inserted in one of plurality of apertures 120, wrench shaft 130 is the fulcrum of torque bar 110.

Figure 2B:
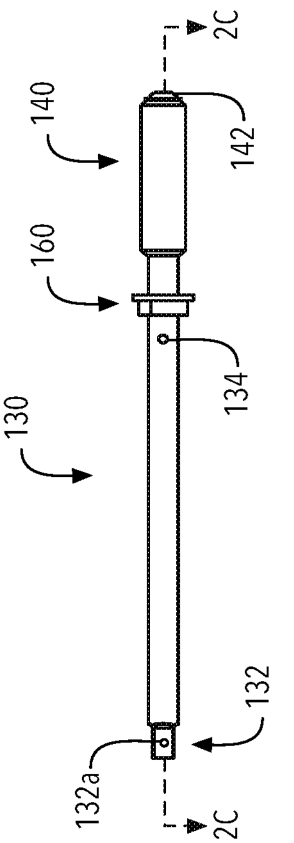
FIG. 2B is a right-side view of the wrench shaft of the adjustable impact wrench shown in FIG. 1.
Figure 2C:
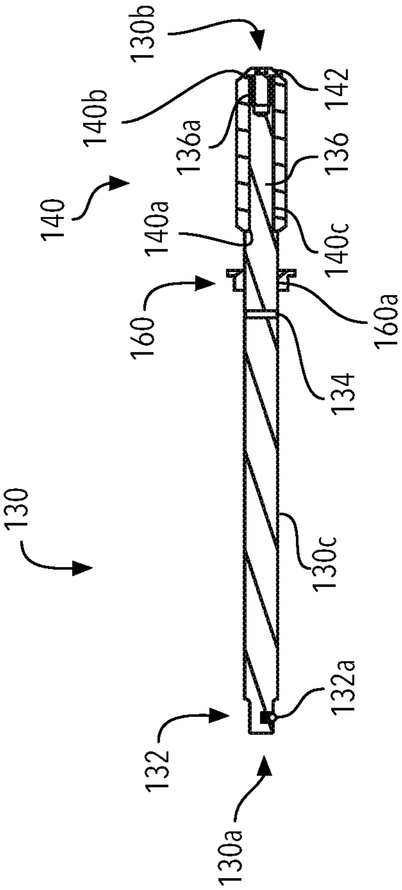
FIG. 2C is a cross-sectional view taken generally along line 2C-2C shown in FIG. 2B.
Figure 2A:
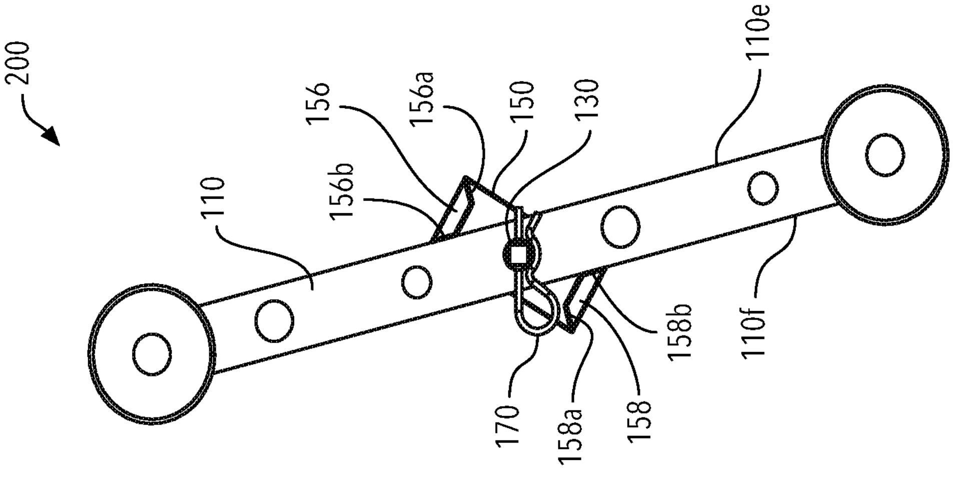
FIG. 2A is a front view of the adjustable impact wrench shown in FIG. 1.

The following description should be taken in view of FIGS. 2A through 2C. FIG. 2A illustrates a front view of wrench 200, FIG. 2B illustrates a right-side view of wrench shaft 130, and FIG. 2C illustrates a cross-sectional view of wrench shaft 130 taken generally along line 2C-2C shown in FIG. 2B. Clamp 150 includes wedges 156 and 158, which extend from clamp 150. Wedge 156 includes restriction means 156*a* and 156*b*, where restriction means 156*a* and 156*b* are angled sections of wedge 156 that are arranged to abut side 110*e* of torque bar 110 when torque bar 110 is rotated, depending on the direction of the rotation. Wedge 158 includes restriction means 158*a* and 158*b*, where restriction means 158*a* and 158*b* are angled sections of wedge 158 that are arranged to abut side 110*f* of torque bar 110 when torque bar 110 is rotated, depending on the direction of the rotation.

Wrench shaft 130 includes two integral sections, securement section 130*c* and handle portion 136, where securement section 130*c* is arranged to be engaged within an aperture of torque bar 110 and handle portion 136 is arranged to accept handle 140 thereon. In a preferred embodiment, wrench shaft 130 includes chuck 132, disposed proximate to first end 130*a*. Chuck 132 includes socket retention means 132*a*, which in a preferred embodiment comprising a spring-loaded socket retention ball. Chuck 132 is preferably arranged to be compatible with any standard ½ inch socket, however it should be appreciated that chuck 132 may be adapted to fit a plurality of different socket sizes, including metric sizes.

Disposed within wrench shaft 110, preferably arranged within securement section 130*c*, is pin aperture 134. Pin aperture 134 is arranged to accept pin 170 therein. In a preferred embodiment, pin aperture 134 is disposed within securement section 130*c* and arranged proximate to restriction nut 160. Restriction nut 160 is preferably fixed secured on securement section 130*c* of wrench shaft 110, proximate to handle portion 136. Handle portion aperture 136*a* is arranged within handle portion 136, proximate to second end 130*b*. Aperture 136*a* is preferably threaded and arranged to accept handle screw 142 therein, securing handle 140 on handle portion 136. Handle 140 includes handle through-bore 140*c*, having two openings, first aperture 140*a* and second aperture 140*b*. It should be noted that the circumference of the head of handle screw 142 is greater than the circumference of second aperture 140*b* of handle 140, preventing handle 140 from disengaging handle portion 136 when handle screw 142 is engaged within aperture 136*a*.

Pin 170, or other like means, such as a removable collar or bracket, prevents torque bar 110 from sliding on wrench shaft 130 in the direction towards first end 130*a*. Inversely, when pin 170 is not engaged to wrench shaft 130, torque bar 110 may freely slide along wrench shaft 130 to either assemble, or disassemble, wrench 200.

Figure 3:
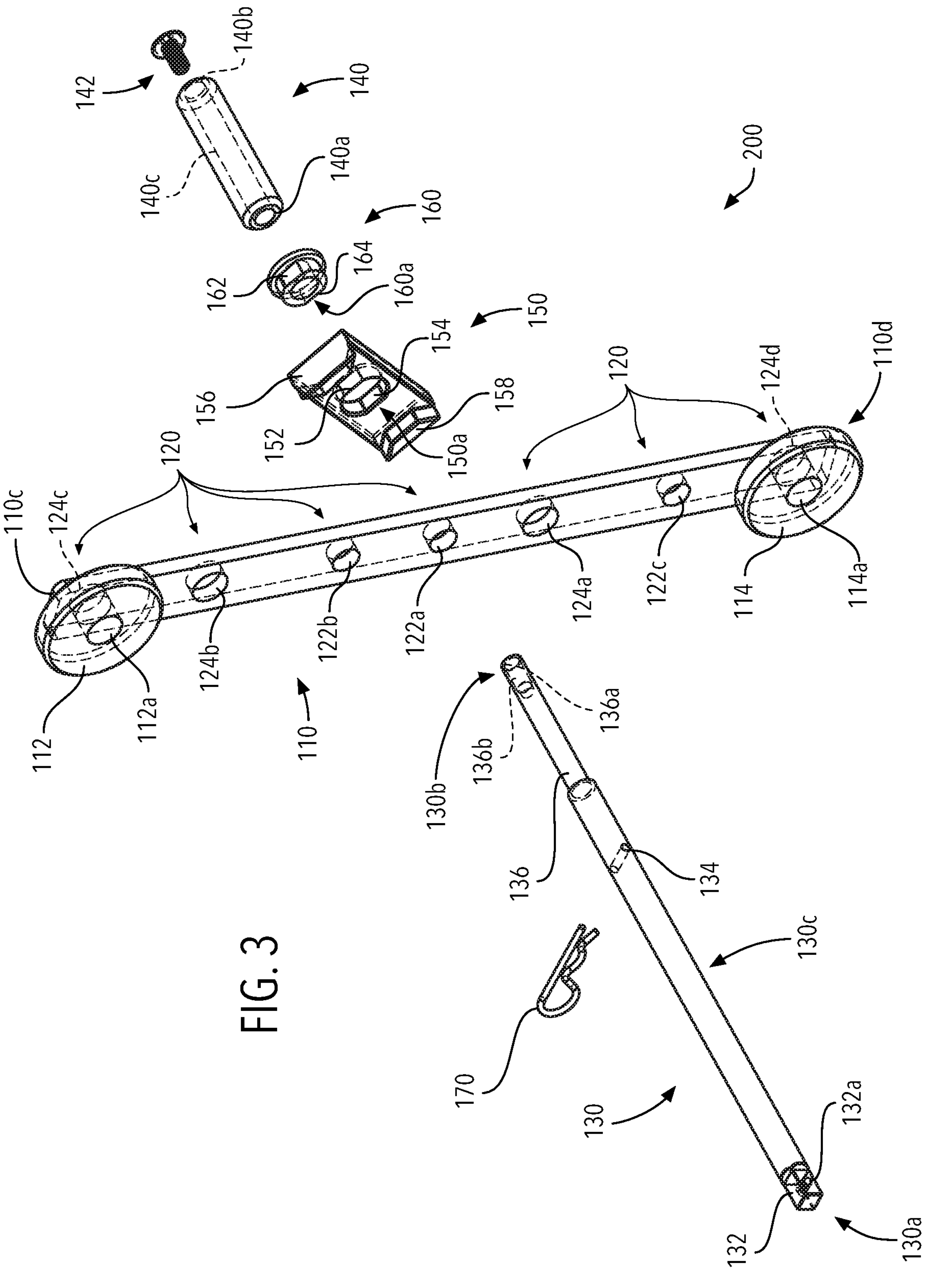
FIG. 3 is an exploded view of the adjustable impact wrench shown in FIG. 1.

FIG. 3 illustrates an exploded view of wrench 200. Restriction nut 160 includes aperture 160*a*, whereby restriction nut 160 engages wrench shaft 130. Aperture 160*a* of restriction nut 160 includes first and second engagement means 162 and 164, which are planar surfaces arranged on the outside surface of restriction nut 160. Clamp 150 includes aperture 150*a*, whereby aperture 150*a* engages wrench shaft 130. Aperture 150*a* of clamp 150 includes first and second engagement means 152 and 154, which are planer surfaces within the inner surface of aperture 150*a*. Restriction nut 160 is arranged to be seated within aperture 150*a* of clamp 150, such that first and second engagement means 162 and 164 of restriction nut 160 abut first and second engagement means 152 and 154 of aperture 150*a* of clamp 150. This abutment configures clamp 150 to rotate concurrently with restriction nut 160 when wrench shaft 130 is rotated due to restriction nut 160 being fixedly secured to wrench shaft 130, shown in greater detail in view of FIGS. 5A and 5B.

FIG. 3 illustrates a plurality of apertures in the torque bar, including apertures 122*a*, 122*b* and 122*c*, in a first set of apertures, each of which has a first diameter; and 112*a* (arranged within weight 112), 114*a* (arranged within weight 114), 124*a*, 124*b*, 124*c* and 124*d*, in a second set of apertures, each of which has a second diameter. It should be appreciated that the term "diameter" is intended to convey its standard meaning, i.e., a round or circular aperture, but that other shapes of these various apertures, in both the first and second sets, are contemplated and intended to be within the scope of the appended claims. Hence, the term "diameter" is intended to also include a variety of shapes, including but not limited to elliptical, oval, oblong, triangular, square, rectangular, pentagonal, hexagonal, octagonal, etc. The apertures of the first size, or first diameter, define the first set of plurality of apertures 120. The apertures of the second size, or second diameter, define the second set of plurality of apertures 120. Each of the plurality of apertures 120 has either the first diameter or the second diameter, where the first diameter is less than the second diameter. Plurality of apertures 120 includes: aperture 112*a* of first weight 112*b* configured as the second size of apertures; aperture 114*a* of second weight 114 configured as the second size of apertures; first aperture of first size 122*a*; second aperture of first size 122*b*; third aperture of first size 122*c*; first aperture of second size 124*a*; second aperture of second size 124*b*; third aperture of second size 124*c*; and, fourth aperture of second size 124*d*. It should be noted that aperture 112*a* and aperture 124*c* are the first end apertures, and aperture 114*a* and aperture 124*d* are the second end apertures, where aperture 112*a* and aperture 124*c* are collinearly arranged and aperture 114*a* and aperture 124*d* are collinearly arranged.

Apertures of the first size of plurality of apertures 120 (122*a*, 122*b* and 122*c*) are arranged to accept wrench shaft 130 therein. Apertures of the second size of plurality of apertures 120 (112*a*, 124*c*, 114*a*, 124*d*, 124*a*, and 124*b*) are arranged to accept an individual spike of plurality of spikes 320 (shown in FIGS. 6-9). In a preferred embodiment, each of the plurality of spikes 320 has a diameter greater than the diameter of the apertures of the first size of plurality of apertures 120 but less than the diameter of the apertures of the second size of plurality of apertures 120. It should also be appreciated that apertures of the second size of plurality of apertures 120 (112*a*, 124*c*, 114*a*, 124*d*, 124*a*, and 124*b*) are substantially circular in shape, however alternative configurations may be contemplated, as described infra.

Figure 4:
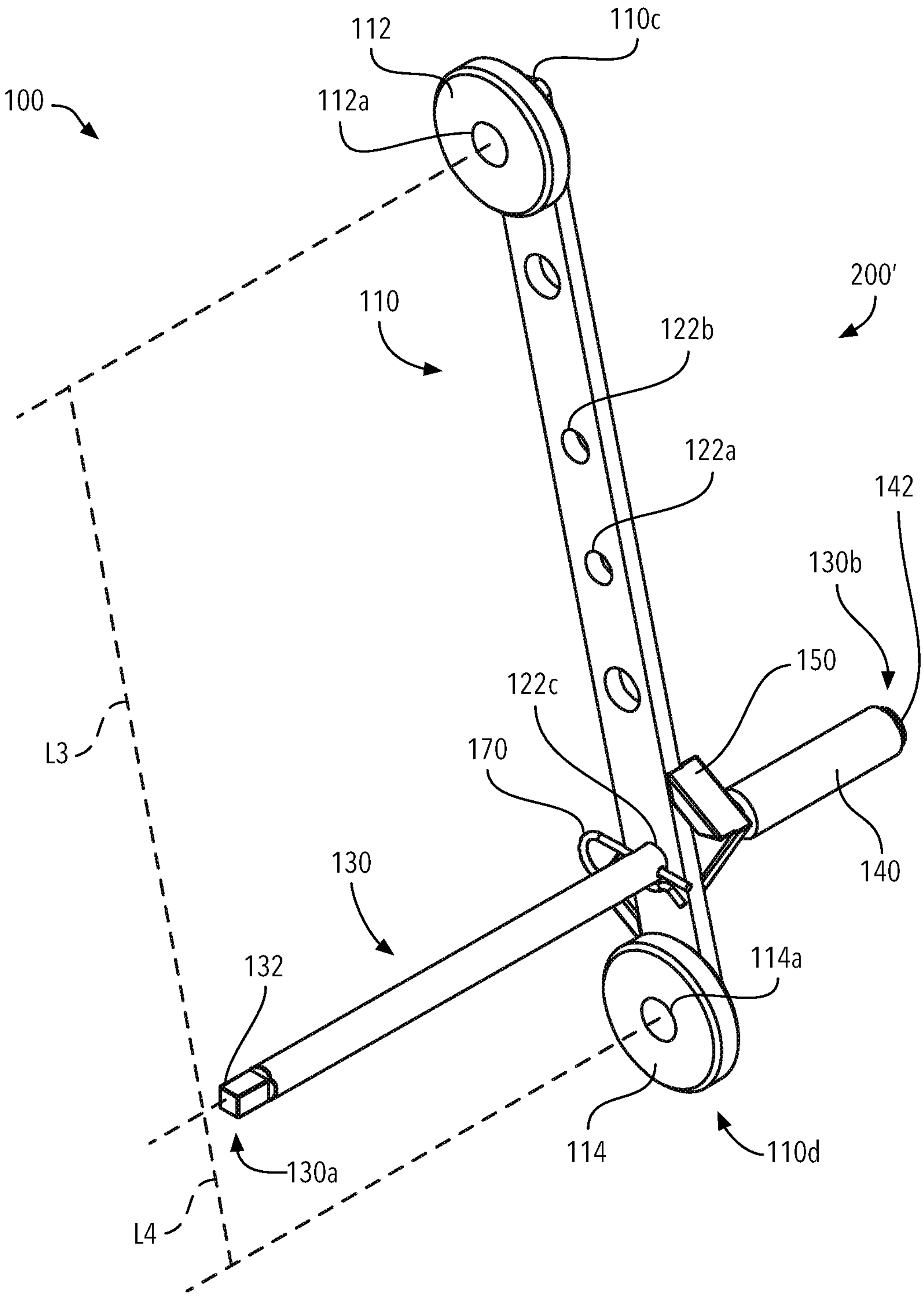
FIG. 4 is a perspective view of the adjustable impact wrench shown in FIG. 1, shown in a different configuration than that shown in FIG. 1.

The following description should be taken in view of FIGS. 1 and 4. FIG. 4 illustrates a perspective view of adjusted wrench 200'. Adjusted wrench 200' is defined by wrench shaft 130 being disposed within either aperture 122*b* or aperture 122*c* (as illustrated in FIG. 4), instead of being disposed within aperture 122*a* (as shown in FIG. 1). Wrench shaft 130, when disposed within apertures 122*c*, creates length L3 between the center points of aperture 122*c* and aperture 112*a*, and creates length L4 between the center points of aperture 122*c* and aperture 114*a*. Length L3 is greater than length L1 and length L2 (shown in FIG. 1), where lengths L1 and L2 are substantially equal.

The moment of a force ($\vec{M}_O$), otherwise known as a moment vector, about a point (O) on an axis is defined as the cross product of the lever arm ($\vec{r}$) and the net force ($\vec{F}$) applied to the lever arm, written algebraically as:

$$\vec{M}_O = \vec{r} \times \vec{F}$$

The axis of the moment vector ($\vec{M}_O$) passes through the moment center (O) and is perpendicular to the plane containing $\vec{r}$ and $\vec{F}$. In 200, as well as 200', the axis of the moment vector ($\vec{M}_O$) is the central axis of wrench shaft 130. The moment center (O) in wrench 200 is aperture 122*a* and the moment center in adjusted wrench 200' is aperture 122*c*. For example, the lever arm ($\vec{r}$) in wrench 200 is L1 and the lever arm in adjusted wrench 200' is L3. If a net force is applied at 112*a*, and that net force is perpendicular to both the lever arm ($\vec{r}$) and the fulcrum (the axis of the moment vector, i.e., wrench shaft 130), then a moment will be applied to the fulcrum. The magnitude of the moment in adjusted wrench 200' will be greater the moment applied in wrench 200 because the net force being applied is equal but the lever arm in adjusted wrench 200' is larger.

Should wrench shaft 130 be disposed within aperture 122*b*, the magnitude of the moment applied to wrench 200 will still be larger than the moment applied to wrench 200 having wrench shaft 130 disposed in aperture 122*a* (shown in FIG. 1), but the magnitude of the moment applied to wrench 200 having wrench shaft 130 disposed within aperture 122*b*, is less than the magnitude of the moment applied to wrench 200'.

Figure 5B:
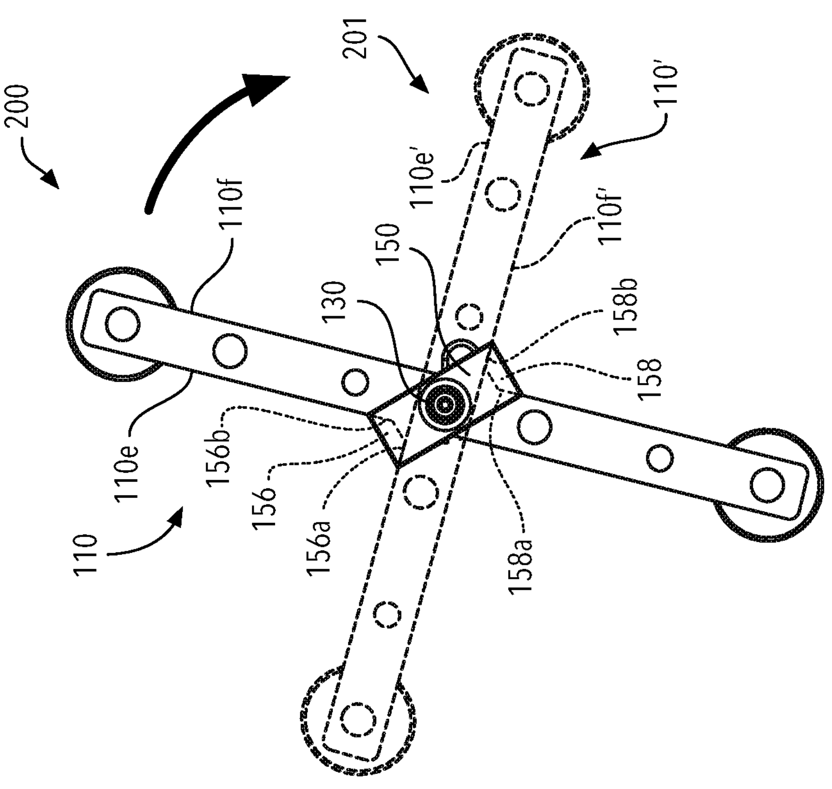
FIG. 5B is a rear view of the adjusted adjustable impact wrench shown in FIG. 1.
Figure 5A:
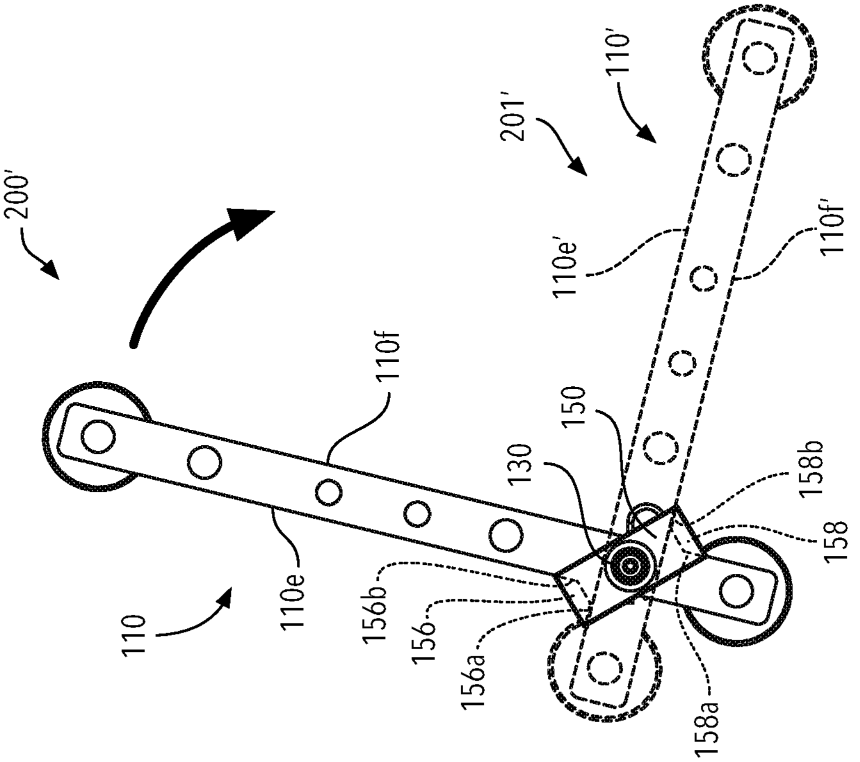
FIG. 5A is a rear view of the adjustable impact wrench shown in FIG. 4.

The following description should be taken in view of FIGS. 1, 4, 5A and 5B, where FIG. 5A is a rear view of adjusted wrench 200' shown in FIG. 4 and FIG. 5B is a rear view of wrench 200 shown in FIG. 1. FIG. 5A and FIG. 5B both illustrate wrenches 200 and 200' rotated into a tightening position, 201 and 201'. 110', 110*e'*, and 1101' all represent 110, 110*e*, and 110*f*, when torque bar 110 of wrench 200 and adjusted wrench 200' is in a tighten positioned (where a tightened torque bar is indicated by 110').

To tighten a lug nut, or other like nuts, attachment means 132*a* of chuck 132 (shown in FIG. 4) is engaged to a socket to engage a lug nut, where wrenches 200 and 200' need to be rotated in the clockwise direction about a central axis of wrench shaft 130, i.e., the fulcrum of torque bars 110. Torque bars 110 of wrenches 200 and 200' will freely rotate about the central axis of wrench shaft 130, specifically between restriction means 156*b* of wedges 156 and restriction means 158*b* of wedges 158 until second outer edges 110*f* (shown in broken lines as 1101) of wrenches 200 and 200' abuts restriction means 158*b* of wedges 158 while first outer edge 110*e* (shown in broken lines as 110*e'*) concurrently abuts restriction means 156*a* of wedges 156. As clockwise rotation is continuously imparted to torque bar 110 while second outer edges 110*f* (shown in broken as 1101) abut restriction means 158*b*, and first outer edges 110*e* abut restriction means 156*a* (shown in broken lines as 110*e'*), torque bar 110 (shown in broken lines as 110') will rotate wrench shafts 130, i.e., wrenches 201 and 201'.

The following description of FIGS. 6-10 depict ground anchor 300 (hereinafter "anchor") of adjustable impact wrench and ground anchor assembly 100.

Figure 6:
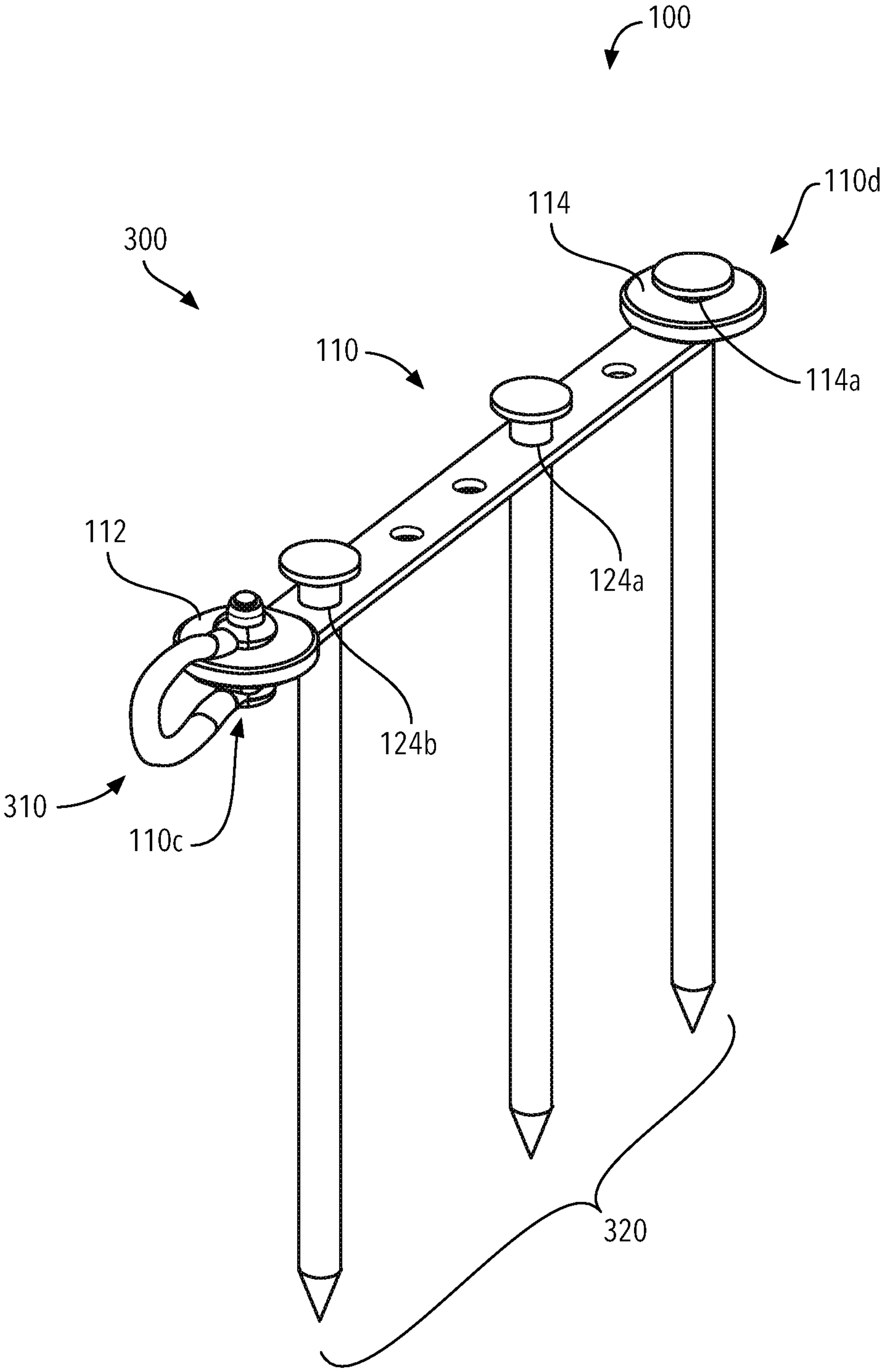
FIG. 6 is a perspective view of the ground anchor configuration of the present invention.
Figure 7A:
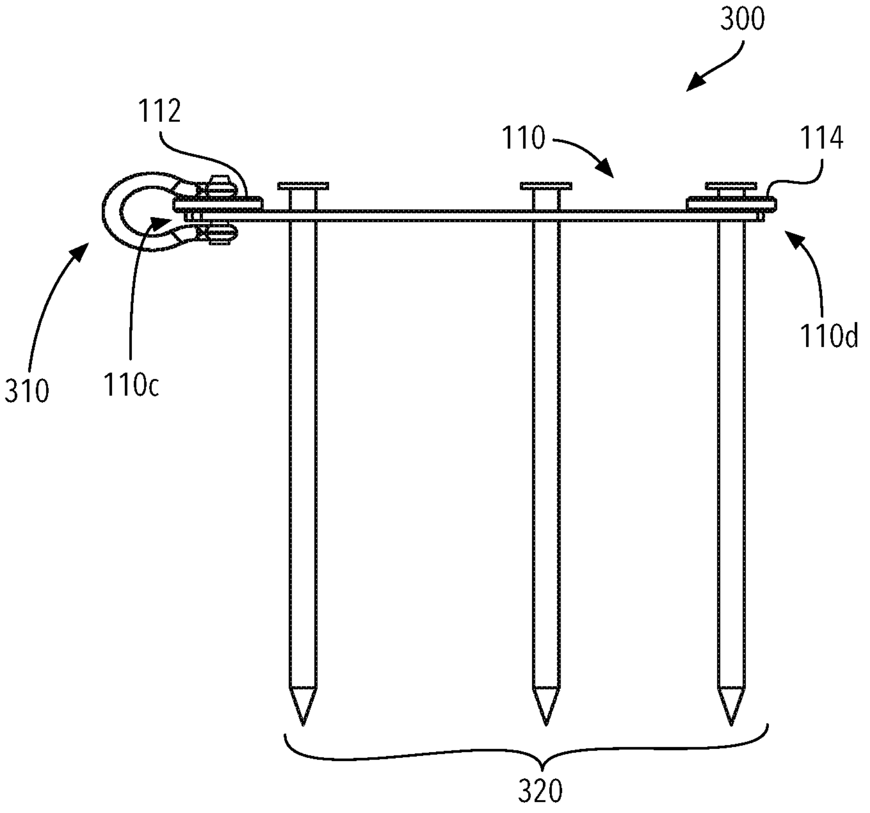
FIG. 7A is a right-side view of the ground anchor configuration shown in FIG. 6.
Figure 7B:
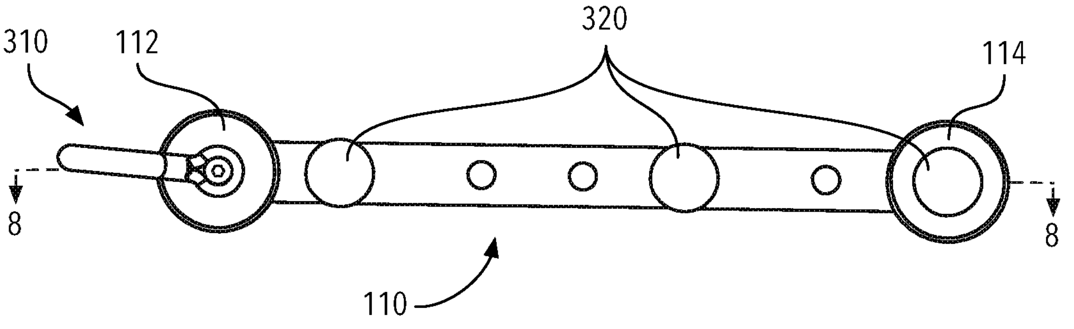
FIG. 7B is a top plan view of the ground anchor configuration shown in FIG. 6.

The following description should be taken in view of FIGS. 6 through 7B. FIG. 6 illustrates a perspective view of anchor 300 of adjustable impact wrench and ground anchor assembly 100, i.e., a ground anchor configuration of torque bar 110. FIG. 7A illustrates a right-side view of anchor 300 and FIG. 7B illustrates a top plan view of anchor 300. Anchor 300 generally comprises, torque bar 110, plurality of spikes 320, and clip 310. Plurality of spikes 320 are shown within apertures 124*b*, 124*a*, and 114*a*, where apertures 124*b*, 124*a*, and 114*a* are of a second size, i.e., second diameter. Clip 310 is secured through a screw (shown and described in greater detail, infra) disposed within aperture 112*a* of weight 112 (shown in FIG. 8). It should be noted that the spike of plurality of spikes 120 disposed within aperture 114*a* may alternatively be disposed within aperture 112*a* of weight 112 and clip 310 may be secured via its screw to aperture 114*a*.

Figure 8:
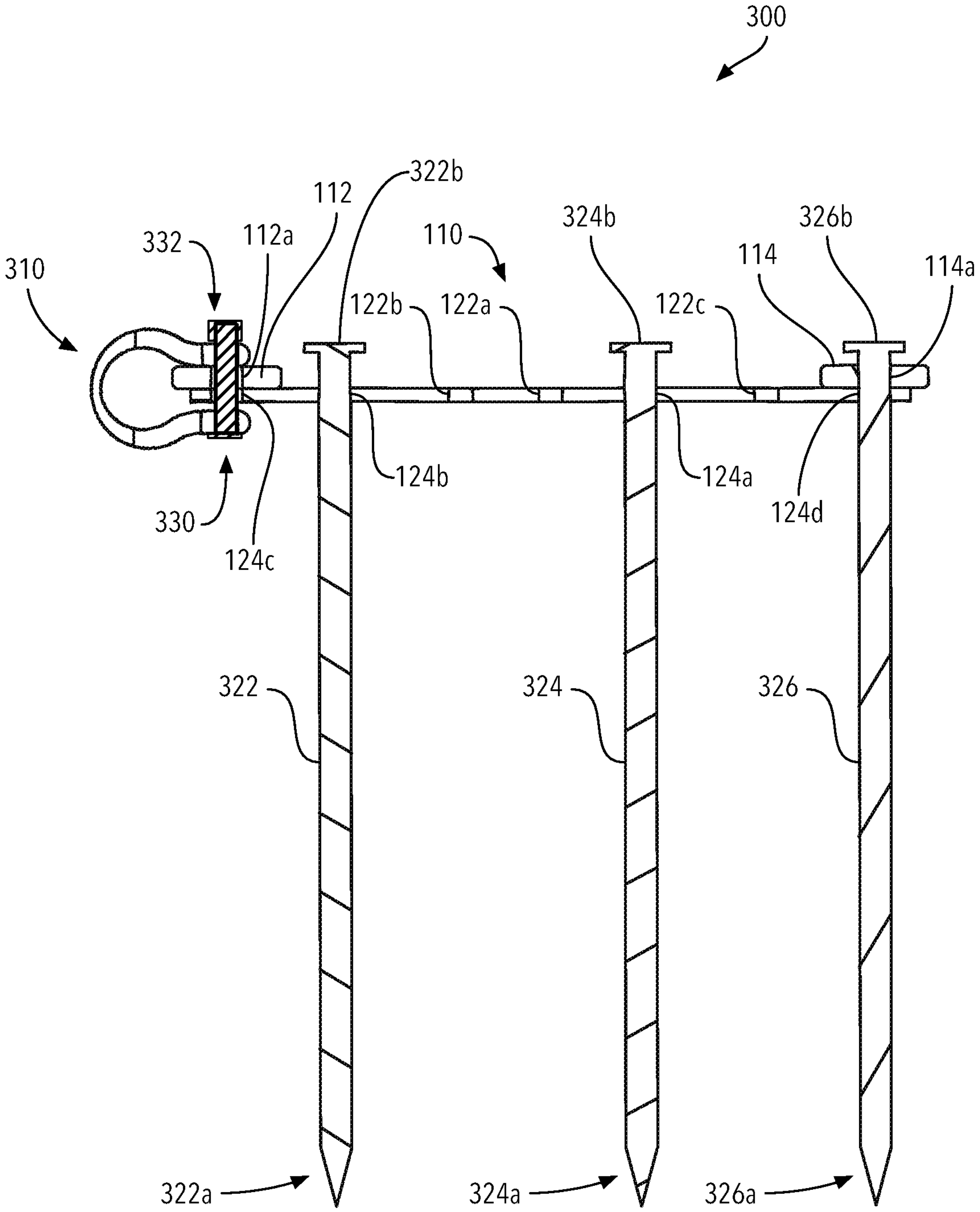
FIG. 8 is a cross-sectional view of the ground anchor configuration, taken generally along line 8-8 in FIG. 7B.

FIG. 8 is a cross-sectional view of anchor 300 taken generally along line 8-8 on FIG. 7B. As shown, spikes 322, 324, and 326 of plurality of spikes 320 are disposed within apertures 124*a*, 124*b*, and 124*d*, respectively, specifically, spike 326 is disposed within apertures 124*d* and 114*a*. Spike 322 terminates at its respective ends, tip end 322*a* and cap end 322*b*. Spike 324 terminates at its respective ends, tip end 324*a* and cap end 324*b*. Spike 326 terminates at its respective ends, tip end 326*a* and cap end 326*b*. The area between the respective end caps and tips of each of plurality of spikes 320 is preferable cylindrical and also has a diameter than is greater than the apertures of the first size (apertures 122*a*, 122*b*, and 122*c*) of plurality of apertures 120 but the diameter of each of plurality of spikes 320 is less than the diameter of the apertures of the second size (apertures 124*a*, 124*b*, 114*a*, and 124*d*) of plurality of apertures 120. Tips, 322*a*, 324*a*, and 326*a* of spikes 322, 324, and 326, are arranged to penetrate the ground under second surface 110*b* of torque bar 110. Caps 322*b*, 324*b*, and 324*c* of spikes 322, 324, and 326, are arranged to prevent torque bar 110 from disengaging each of the spikes from their respective apertures when force is imparted on clip 310, i.e., caps 322*b*, 324*b*, and 324*c* of spikes 322, 324, and 326 have an external circumference that is greater than the inner circumference of apertures 124*a*, 124*b*, 124*d*, and 114*a*. Clip 310 includes two apertures (shown in FIG. 9) which engage clip bolt 330. Clip bolt 330 is arranged to be seated with apertures 112*a* and 124*c* when engaged within the apertures of clip 310 and is secured within apertures 112*a* and 124*c* via clip nut 330.

Figure 9:
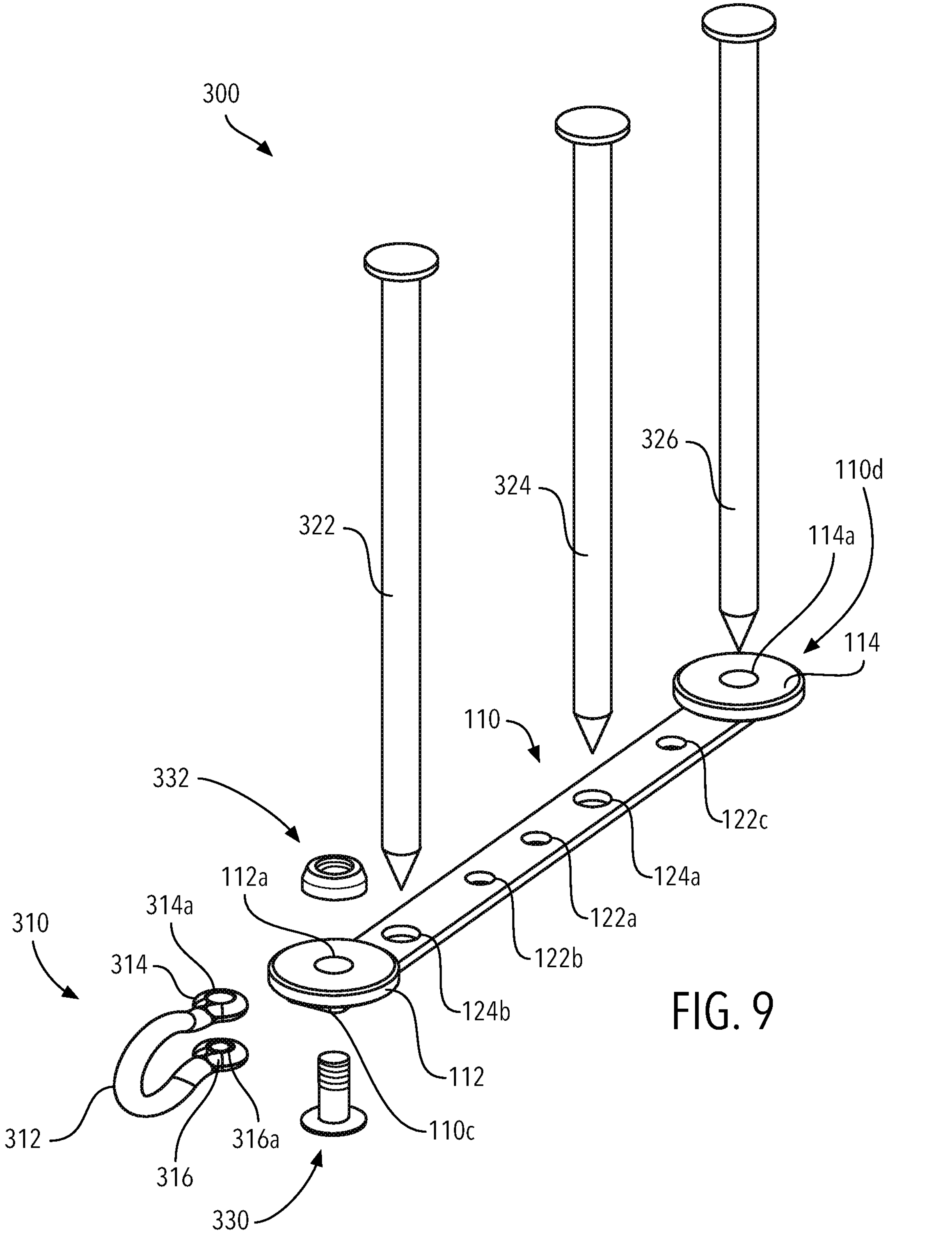
FIG. 9 is an exploded perspective view of the ground anchor configuration shown in FIG. 6; and, FIG. 10 is a right side view of the ground anchor configuration shown in use, with the spikes secured within the ground.

FIG. 9 is an exploded perspective view of anchor 300. Clip 310 comprises attachment section 312 which terminates into first end 314 and second end 316. Disposed within first end 314 is aperture 314*a* and disposed within second end 316 is aperture 316*a*. To engage clip 310 to torque bar 110, apertures 314*a* and 316*a* are aligned with apertures 112*a* and 124*c* (shown in FIG. 8), where bolt 330 is inserted through apertures 316*a*, 124*c*, 112*a*, and 314*a*, exposing a threaded section of bolt 330 through aperture 314*a* where nut 332 is arranged to threadably secure to the exposed threaded section of bolt 330.

Figure 10:
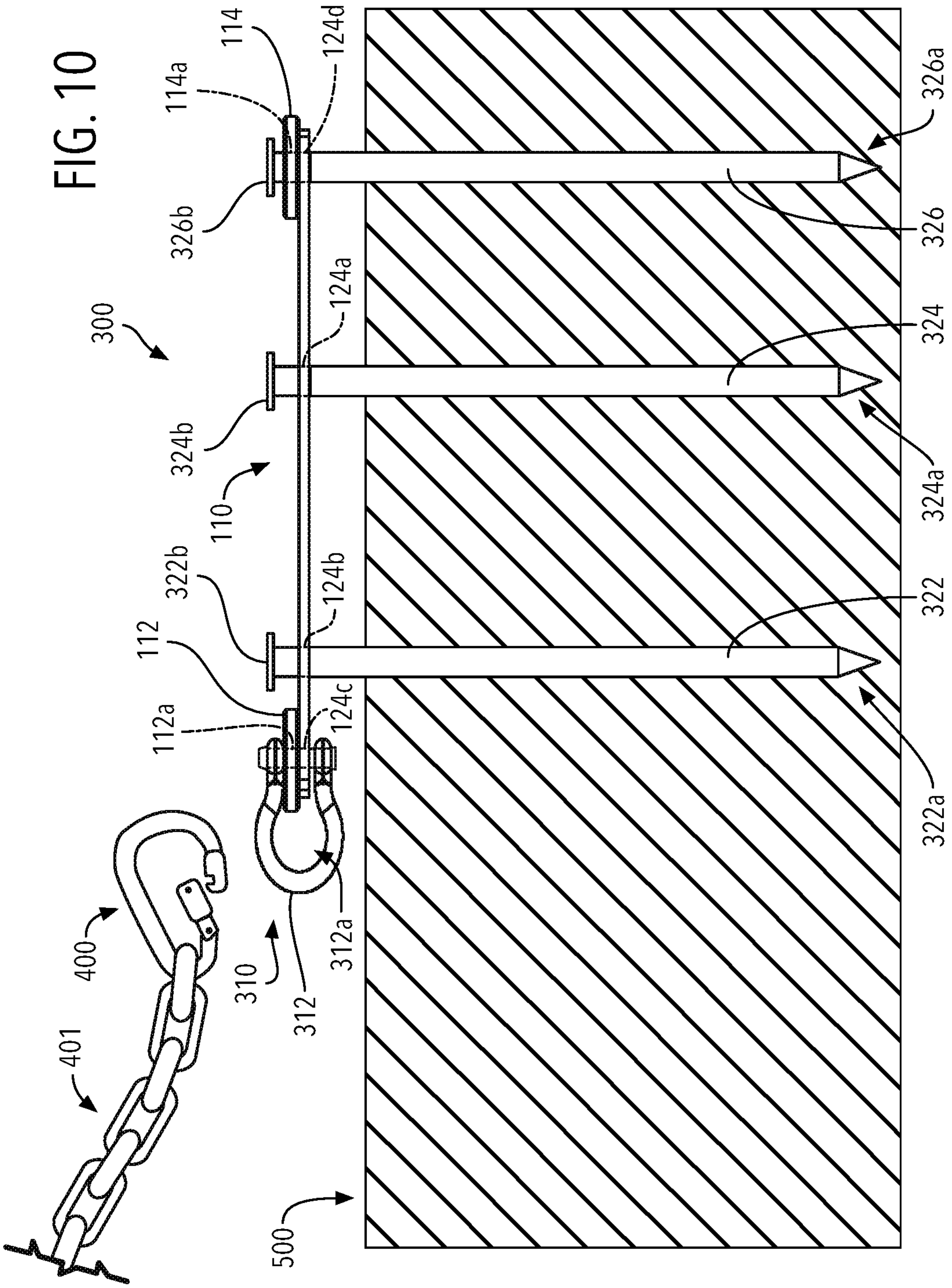

FIG. 10 is a right-side view of anchor 300 in use, specifically illustrating plurality of spikes 320 inserted into ground 500 that torque bar 110 is resting above. To use anchor 300, clip 300 is first attached to torque bar 110, as described supra. Then, each respective stake (322, 324, and 326) are placed in their respective apertures (124*b*; 124*a*; and, 114*a* and 124*d*). After, each stake (322, 324, and 326) will have a force imparted on their respective caps (322*b*, 324*b*, and 326*b*), such as a hammer impact. The force imparted on each stake (322, 324, and 326) drives the stakes tips (322*a*, 324*a*, and 326*a*) through the respective apertures (124*b*; 124*a*; and, 114*a* and 124*d*) and into ground 500—securing anchor 300 thereto. Lastly, attachment clip 400 (illustrated as a known-in-the carabiner clip), or other suitable attachment means, such as a rope, chain, etc., is connected to attachment loop 312*a*, formed by attachment section 312 of clip 310, where attachment clip 400 is connected to attachment chain 401 (or other means, such as a rope, strap, etc.). Attachment chain 401 could be connected to a powered winch, a vehicle, or a person. One with ordinary skill in the art would appreciate that a mounted anchor 300, as shown, could be used in a plurality of situations where an object or person, needs to be connected to a fixed point, i.e., a mounted anchor 300.

In a preferred embodiment, all of the aforementioned components are made of a tempered steel, and it should be appreciated that alternative metal alloys, stainless steel, or an extremely durable plastic, carbon fiber, or polymer could be used for all, or some of the components—in various combinations of the exemplary materials provided above.

In a preferred embodiment, the apertures of a second diameter disposed within the torque bar, as described supra, are of a larger diameter than each spike of the plurality of spikes—allowing the spikes to be inserted into the torque bar and the ground there below, at an angle, thereby increasing the integrity of the ground connection of a "staked" ground anchor (shown in FIG. 10) when force is imparted onto the torque bar.

It should also be appreciated that although the plurality of apertures disposed within the torque are preferable two different sizes, in alternative embodiments, the plurality of apertures may be the same size. It should be further appreciated that in a preferred embodiment the plurality of apertures are substantially circular, however, alternative shaped-apertures could be utilized, e.g., square, rectangular, oblong, elliptical, etc.

Although the weights are affixed to the torque bar in a preferred embodiment, it is contemplated that in alternative embodiments, the weights could be detachable in order to facilitate a further disassembly of the present invention. The weights also have a secondary purpose of providing handles for a user rotating the adjustable wrench to tighten or loosen a nut (similar to FIGS. 5A and 5B).

The plurality of spikes are preferably linear, or straight, however, in alterative embodiments, the plurality of spikes could have a contoured, or curved configuration. Additionally, in a preferred embodiment, the plurality of spikes have a substantially circular body, or cylindrical, however, alternative shapes may be used, such as square or rectangular shapes, triangular, octagonal, oblong, elliptical, hexagonal, pentagonal, etc.

Although the aforementioned description illustrates a chuck disposed at the first end of the wrench shaft of the adjustable impact wrench, it should be appreciated in alternative embodiments that a socket could be directly fixed, or integral, with the first end of the wrench shaft, thereby removing the need for the chuck and its respective attachment means. Similarly, the handle, disposed on the wrench shaft proximate to the second end of the wrench shaft, could be integral with the wrench shaft and thereby removing the need for the screw aperture disposed within the second end of the wrench shaft. Also similar, the clamp could be fixedly secured on the wrench shaft, thereby removing the need for the restriction nut secured on the wrench shaft in the preferred embodiment.

In further alternative embodiments, the wrench shaft could include a known-in-the-art rachet system, like a socket wrench. The wrench shaft would include a ratcheting mechanism allowing a nut engaged to the chuck to be tightened or loosened with a reciprocating motion, thereby eliminating the need to potentially remove and refit the wrench after each turn in limited-space situations. Such ratcheting mechanism within the wrench shaft would also include a lever on the wrench shaft that is arranged to switch the wrench shaft between a tightening and a loosening configuration.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCES NUMERALS

100 Adjustable impact wrench and ground anchor assembly
110 Torque bar of 100
110' Torque bar of 201 and 201'
**110*a* First face of torque bar 110**
**110*b* Second face of torque bar 110**
**110*c* First end of torque bar 110**
**110*d* Second end of torque bar 110**
**110*e* First outer edge of torque bar 100**
**110*e*' First outer edge of torque bar 110'**
**110*f* Second outer edge of torque bar 110**
**110*f*' Second outer edge of torque bar 110'**
112 First weight
**112*a* Aperture of first weight 112**
114 Second weight
**114*a* Aperture of second weight 114**
120 Plurality of apertures of torque bar 100
**122*a* First aperture of first size of plurality of apertures 120**
**122*b* Second aperture of first size of plurality of apertures 120**
**122*c* Third aperture of first size of plurality of apertures 120**
**124*a* First aperture of second size of plurality of apertures 120**
**124*b* Second aperture of second size of plurality of apertures 120**
**124*c* First end aperture of second size of plurality of apertures 120**
**124*d* Second end aperture of second size of plurality of apertures 120**
130 Wrench shaft
**130*a* First end of wrench shaft 130**
**130*b* Second end of wrench shaft 130**
132 Chuck of wrench shaft 130
**132*a* Attachment means of chuck 132**
134 Pin aperture of wrench shaft 130
136 Handle portion of wrench shaft 130
**136*a* Aperture of handle portion 136**
140 Handle of wrench shaft 130
**140*a* First aperture of handle 140**
**140*b* Second aperture of handle 140**
**140*c*** Handle through-bore
142 Handle screw
150 Clamp
**150*a*** Clamp aperture
152 First engagement means of aperture **150*a***
154 Second engagement means of aperture **150*a***
156 First wedge of clamp 150
**156*a* First restriction edge of first wedge 156**
**156*b* Second restriction edge of first wedge 156**
158 Second wedge of clamp 150
**158*a* First restriction edge of second wedge 158**
**158*b* Second restriction edge of second wedge 158**
160 Restriction nut
**160*a*** Aperture of restriction nut
170 Pin
200 Adjustable impact wrench
201 Tightened wrench 200
200' Adjusted adjustable impact wrench
201' Tight adjusted wrench 200'
300 Ground anchor
310 Clip
312 Attachment section of clip 310
**312*a* Attachment loop of attachment section 312**
314 First end of clip 310
**314*a* Aperture of first end 314**
316 Second end of clip 310
**316*a* Aperture of second end 316**
320 Plurality of spikes
322 First spike
**322*a* Tip of first spike 322**
**322*b* Cap of first spike 322**
324 Second spike
**324*a* Tip of second spike 324**
**324*b* Cap of second spike 324**
326 Third spike
**326*a* Tip of third spike 326**
**326*b* Cap of third spike 326**
330 Clip bolt
332 Clip nut
400 External attachment clip
401 External attachment chain
500 Ground
L1 First length
L2 Second length
L3 Third length
L4 Fourth length

What is claimed is:

1. An adjustable impact wrench and ground anchor assembly, comprising:

a torque bar having a first end and a second end, said torque bar having a first set of a plurality of apertures disposed therein and a second set of a plurality of apertures disposed therein, each aperture in said first set having a first diameter and each aperture in said second set having a second diameter, where said first diameter is less than said second diameter;

a wrench shaft, said wrench shaft having a first end and a second end, said wrench shaft having a chuck arranged at said first end, said wrench shaft having a removable handle arranged at said second end, said wrench shaft arranged to be seated within one of said first diameter apertures of said plurality of apertures;

a clamp, said clamp arranged to accept said wrench shaft through an aperture disposed therein;

a pin, said pin arranged to engage a pin aperture of said wrench shaft and further arranged to sandwich said bar between said pin and said clamp;

a plurality of spikes, each one of which spikes is arranged to engage at least one of an aperture of said second set of apertures, where each one of said plurality of spikes has a third diameter which is greater than said first diameter; and, a clip, said clip arranged to engage one of a pair of end apertures of said plurality of apertures.

2. The adjustable impact wrench and ground anchor assembly recited in claim 1, wherein said clamp comprises a first end and a second end, said clamp further comprising an aperture, extending from said first end and said second end of said clamp are a pair of restriction members, said restriction members are arranged to abut an external surface of said torque bar when said clamp is engaged to said wrench shaft via said aperture.

3. The adjustable impact wrench and ground anchor assembly recited in claim 2, wherein a lock nut is fixedly secured on said wrench shaft, said lock nut arranged to be seated with an aperture of said clamp thereby restricting rotational movement of said clamp about said wrench shaft.

4. The adjustable impact wrench and ground anchor assembly recited in claim 1, wherein said chuck of said wrench shaft is arranged to accept a socket thereon.

5. The adjustable impact wrench and ground anchor assembly recited in claim 1, wherein said plurality of spikes each comprise a first end and a second end, said first end of each of said plurality of spikes having a tip, said second end of each of said plurality of spikes having an end cap, wherein said end cap of each of said plurality of spike has a circumference greater than the circumference of each of said second diameter apertures of said plurality of apertures.

6. The adjustable impact wrench and ground anchor assembly recited in claim 1, wherein said pair of end apertures of said torque bar are disposed proximate to said first end and said second end of said torque bar, wherein said pair of end apertures are said second diameter apertures of said plurality of apertures.

7. The adjustable impact wrench and ground anchor assembly recited in claim 6, wherein said torque bar comprises a pair of weights disposed proximate to said first end and said second end of said torque bar, wherein said pair of weights each comprise a weight aperture, said weight apertures further arranged to align with said pair of end apertures.

8. The adjustable impact wrench and ground anchor assembly recited in claim 1, wherein said adjustable impact wrench has an adjustable moment, said adjustable moment is determined by which aperture of said first set of said plurality of apertures said wrench shaft is disposed within.

9. The adjustable impact wrench and ground anchor assembly recited in claim 1 wherein each of said first set of a plurality of apertures is round.

10. The adjustable impact wrench and ground anchor assembly recited in claim 1 wherein each of said second set of a plurality of apertures is round.

11. An adjustable impact wrench and ground anchor assembly, comprising:

a torque bar having a first, a second end, and a plurality of apertures comprising a first set and a second set disposed therein, where the first set of apertures have a first diameter and the second set of apertures have a second diameter, where said first diameter is less than said second diameter;

said torque bar having an adjustable impact wrench configuration whereby said torque bar is arranged to accept a wrench shaft within one of said first set of said plurality of apertures, said wrench shaft secured within one of said plurality of apertures of the first diameter via a clamp arranged on said wrench shaft and a pin arranged to engage said wrench shaft; and, said torque bar having a ground anchor configuration whereby said torque bar is arranged to accept at least one spike of a plurality of spikes within at one of said second set of said plurality of apertures, each of said plurality of spikes have a diameter greater than said first diameter and less than said second diameter, said torque bar further arranged to accept a clip within one of a pair of end apertures of said second set of said plurality of apertures, said pair of end apertures arranged proximate to the respective first and second ends of said torque bar.

12. The adjustable impact wrench and ground anchor assembly recited in claim 11, wherein said clamp comprises a first end and a second end, said clamp further comprising an aperture, extending from said first end and said second end of said clamp are a pair of restriction members, said restriction members are arranged to abut an external surface of said torque bar when said clamp is engaged to said wrench shaft via said aperture.

13. The adjustable impact wrench and ground anchor assembly recited in claim 12, wherein a lock nut is fixedly secured on said wrench shaft, said lock nut arranged to be seated with an aperture of said clamp thereby restricting rotational movement of said clamp about said wrench shaft.

14. The adjustable impact wrench and ground anchor assembly recited in claim 11, wherein said wrench shaft includes a first and second ends, said wrench shaft having a chuck arranged on said first end wherein said chuck is arranged to accept a socket thereon.

15. The adjustable impact wrench and ground anchor assembly recited in claim 11, wherein said plurality of spikes each comprise a first end and a second end, said first end of each of said plurality of spikes having a tip, said second end of each of said plurality of spikes having an end cap, wherein said end cap of each of said plurality of spike has a diameter greater than the diameter of each of said second set of said plurality of apertures.

16. The adjustable impact wrench and ground anchor assembly recited in claim 11, wherein said torque bar comprises a pair of weights disposed proximate to said first end and said second end of said torque bar, wherein said pair of weights each comprise a weight aperture, said weight apertures further arranged to align with said pair of end apertures.

17. The adjustable impact wrench and ground anchor assembly recited in claim 11, wherein said adjustable impact wrench configuration has an adjustable moment, said adjustable moment is determined by which aperture of said first set of said plurality of apertures said wrench shaft is disposed within.

18. An adjustable impact wrench and ground anchor assembly, comprising:

a wrench shaft;

a plurality of spikes; and, a torque bar having a plurality of apertures, wherein at least two of said plurality of apertures are of different sizes, wherein said wrench shaft is arranged to engage with at least one of said plurality of apertures of said torque bar, wherein each of said plurality of spikes may pass through and engage at least one of said at least two of said plurality of apertures but not pass through and engage at least one other of said at least two of said plurality of apertures.

19. The adjustable impact wrench and ground anchor assembly recited in claim 18, wherein said adjustable impact wrench configuration has an adjustable moment, said adjustable moment is determined by which aperture of said plurality of apertures said wrench shaft is disposed within.

* * * * *